(12) United States Patent
Duesler et al.

(10) Patent No.: US 10,436,115 B2
(45) Date of Patent: Oct. 8, 2019

(54) HEAT EXCHANGER FOR GAS TURBINE ENGINE WITH SUPPORT DAMPER MOUNTING

(71) Applicant: UNITED TECHNOLOGIES CORPORATION, Farmington, CT (US)

(72) Inventors: Paul W. Duesler, Manchester, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 359 days.

(21) Appl. No.: 15/242,973

(22) Filed: Aug. 22, 2016

(65) Prior Publication Data

US 2018/0051630 A1 Feb. 22, 2018

(51) Int. Cl.
*F02C 7/18* (2006.01)
*F02C 7/20* (2006.01)
*F01D 25/12* (2006.01)
*F02C 6/12* (2006.01)

(52) U.S. Cl.
CPC ............... *F02C 7/18* (2013.01); *F01D 25/12* (2013.01); *F02C 6/12* (2013.01); *F02C 7/20* (2013.01); *F05D 2260/213* (2013.01); *F05D 2260/30* (2013.01); *F05D 2260/96* (2013.01); *Y02T 50/676* (2013.01)

(58) Field of Classification Search
CPC ...... F02C 3/13; F02C 6/08; F02C 7/14; F02C 7/16; F02C 7/18; F02C 7/185; F02C 9/18; F02C 7/20; F02C 7/32; F28F 2275/00; F28F 2265/30; F28F 2255/02; F16B 5/0621; F16B 5/065; F16B 5/0628; F16B 5/0664; F16B 2200/50; F05D 2260/30; F05D 2260/96; F05D 2260/213
See application file for complete search history.

(56) References Cited

U.S. PATENT DOCUMENTS

| 3,842,597 | A | * | 10/1974 | Ehrich | F02C 7/141 60/226.1 |
|---|---|---|---|---|---|
| 4,180,973 | A | | 1/1980 | Siegfried et al. | |
| 4,254,618 | A | * | 3/1981 | Elovic | F02C 7/185 60/226.1 |
| 4,474,001 | A | * | 10/1984 | Griffin | F02C 7/16 60/204 |
| 5,297,386 | A | * | 3/1994 | Kervistin | F01D 11/24 415/115 |

(Continued)

OTHER PUBLICATIONS

European Search Report for European Application No. 17187328.4 dated Jan. 17, 2018.

*Primary Examiner* — William H Rodriguez
(74) *Attorney, Agent, or Firm* — Carlson, Gaskey & Olds, P.C.

(57) ABSTRACT

A gas turbine engine has a core engine with a compressor section and a turbine section. The compressor section includes a low pressure compressor and a high pressure compressor. A cooling air system taps compressed air and passes the compressed air through a heat exchanger. Cooling air passes over the heat exchanger to cool the compressed air, which is returned to the core engine to provide a cooling function. The heat exchanger is mounted through a flexible mount allowing movement between a static structure and the heat exchanger.

17 Claims, 4 Drawing Sheets

(56) References Cited

U.S. PATENT DOCUMENTS

| | | | | |
|---|---|---|---|---|
| 5,392,614 | A * | 2/1995 | Coffinberry | F02C 7/12 60/806 |
| 5,452,573 | A * | 9/1995 | Glickstein | F02C 6/08 60/39.183 |
| 5,581,996 | A * | 12/1996 | Koch | F01D 5/141 60/266 |
| 5,611,197 | A * | 3/1997 | Bunker | F02C 7/185 415/115 |
| 5,685,158 | A * | 11/1997 | Lenahan | F01D 5/081 416/95 |
| 5,697,208 | A * | 12/1997 | Glezer | F01D 5/022 60/785 |
| 5,729,969 | A * | 3/1998 | Porte | F02C 6/08 60/226.1 |
| 5,918,458 | A * | 7/1999 | Coffinberry | F02C 7/185 60/785 |
| 8,453,456 | B2 | 6/2013 | Jarmon | |
| 8,756,910 | B2 * | 6/2014 | Donovan | F01D 25/12 415/115 |
| 8,776,869 | B2 | 7/2014 | Barnes et al. | |
| 8,858,161 | B1 * | 10/2014 | Ryznic | F02C 7/143 415/1 |
| 9,677,474 | B2 * | 6/2017 | Hundley, Jr. | F02C 7/12 |
| 2005/0022535 | A1 * | 2/2005 | Palmisano | F01D 25/12 60/772 |
| 2007/0130912 | A1 * | 6/2007 | Kraft | F02C 6/08 60/226.1 |
| 2008/0230651 | A1 * | 9/2008 | Porte | B64D 13/06 244/118.5 |
| 2008/0310955 | A1 * | 12/2008 | Norris | F02C 7/14 415/178 |
| 2011/0162387 | A1 * | 7/2011 | Chir | F01D 5/081 60/806 |
| 2013/0108425 | A1 * | 5/2013 | Norris | F01D 11/005 415/191 |
| 2013/0219854 | A1 * | 8/2013 | Alecu | F02K 3/115 60/204 |
| 2014/0208768 | A1 * | 7/2014 | Bacic | F01D 5/082 60/782 |
| 2014/0290272 | A1 * | 10/2014 | Mulcaire | F01D 25/12 60/806 |
| 2016/0312704 | A1 * | 10/2016 | Suciu | F02C 3/13 |
| 2017/0268426 | A1 * | 9/2017 | Duesler | F02C 7/32 |
| 2017/0298825 | A1 * | 10/2017 | Golan | F02C 3/04 |
| 2017/0306847 | A1 * | 10/2017 | Suciu | F02C 3/04 |
| 2017/0321605 | A1 * | 11/2017 | Slavens | F02C 3/04 |
| 2018/0010520 | A1 * | 1/2018 | Iwasaki | F01D 25/12 |
| 2018/0038243 | A1 * | 2/2018 | Rambo | F01D 17/105 |
| 2018/0058328 | A1 * | 3/2018 | Schwarz | F02C 7/141 |
| 2018/0080383 | A1 * | 3/2018 | Snape | F02C 7/185 |
| 2018/0080389 | A1 * | 3/2018 | Schwarz | F02C 9/18 |
| 2018/0142715 | A1 * | 5/2018 | Schulz | F16B 2/24 |
| 2018/0156121 | A1 * | 6/2018 | Snape | F02C 7/185 |
| 2018/0187602 | A1 * | 7/2018 | Snape | F02C 7/143 |
| 2018/0202358 | A1 * | 7/2018 | Julien | F02C 5/06 |

* cited by examiner

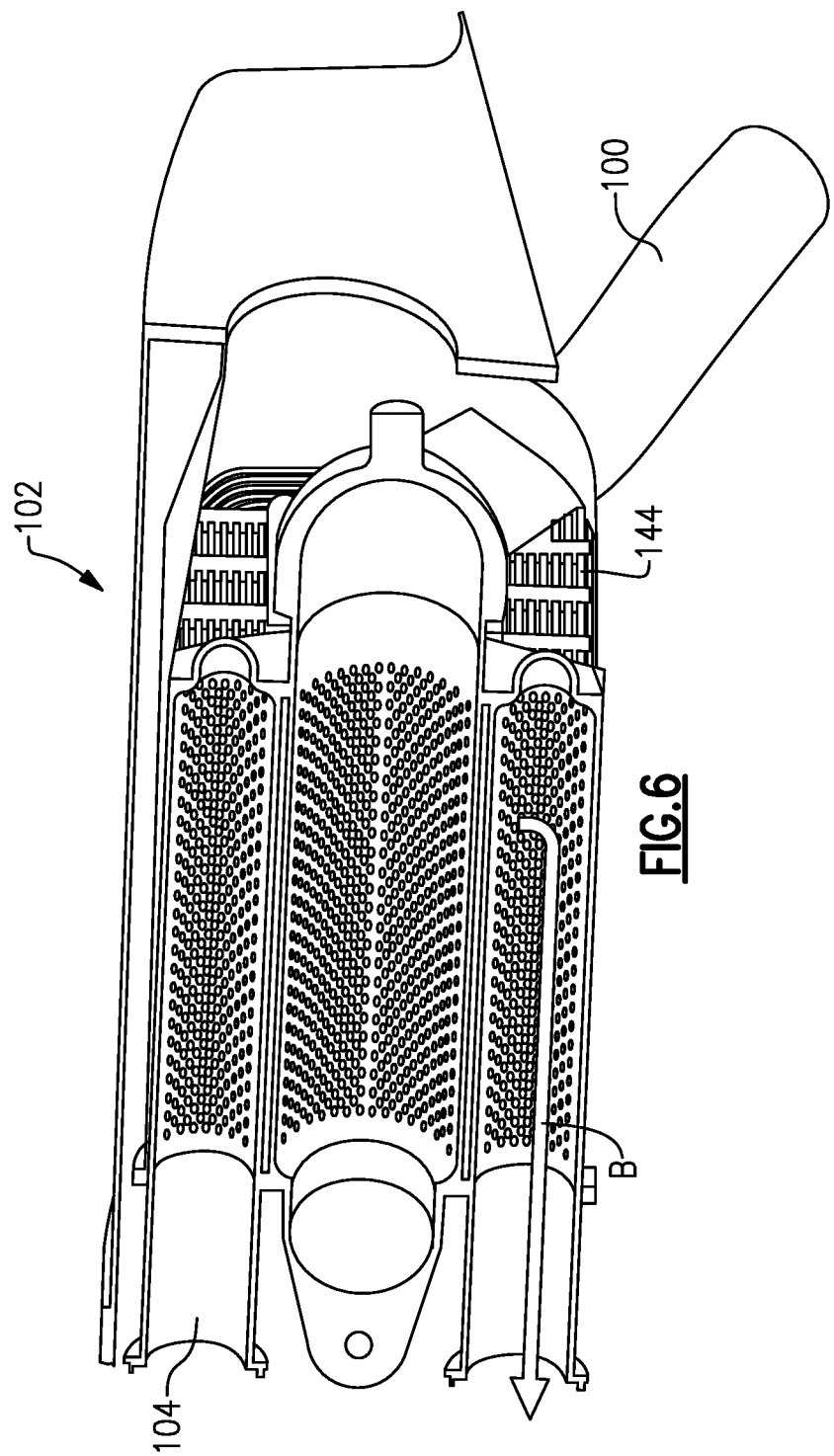

HEAT EXCHANGER FOR GAS TURBINE ENGINE WITH SUPPORT DAMPER MOUNTING

STATEMENT REGARDING FEDERALLY SPONSORED RESEARCH OR DEVELOPMENT

This invention was made with government support under Contract No. FA8650-09-D-2923, awarded by the United States Air Force. The Government has certain rights in this invention.

BACKGROUND

This application relates to a heat exchanger in a gas turbine engine which is mounted with a damper to resist thermal stresses and vibration.

Gas turbine engines are known and typically include a fan delivering air into a bypass duct as propulsion air, and further providing air into a core housing. Air in the core housing passes into a compressor where it is compressed, and then into a combustor where it is mixed with fuel and ignited. Products of this combustion pass downstream over turbine rotors, driving them to rotate.

As is known, turbine components see very high temperatures and thus cooling air has been typically provided to those components. Historically, the fan and a low pressure compressor have rotated as a single unit along with a fan drive turbine. However, more recently, a gear reduction has been placed between the fan rotor and the fan drive turbine. This allows the fan rotor to rotate at slower speeds and the fan drive turbine to rotate at faster speeds. This raises the challenges on the turbine components and requires more efficient provision of the cooling air.

At the same time, the overall pressure ratio provided by the compressor has increased. Historically, the air to cool the turbine components has been tapped from a location downstream of a highest pressure location on the compressor. However, with the increase in overall pressure ratio, this air has become hotter.

The heat exchangers for cooling this air are thus subject to extreme challenges.

SUMMARY

In a featured embodiment, a gas turbine engine has a core engine with a compressor section and a turbine section. The compressor section includes a low pressure compressor and a high pressure compressor. A cooling air system taps compressed air and passes the compressed air through a heat exchanger. Cooling air passes over the heat exchanger to cool the compressed air, which is returned to the core engine to provide a cooling function. The heat exchanger is mounted through a flexible mount allowing movement between a static structure and the heat exchanger.

In another embodiment according to the previous embodiment, the flexible mount allows movement between the static structure and the heat exchanger in at least two dimensions.

In another embodiment according to any of the previous embodiments, the heat exchanger is positioned between a fan case and an intermediate engine case surrounding the core engine.

In another embodiment according to any of the previous embodiments, at least two flanges are formed on the intermediate engine case at two axially spaced locations and there being one of the flexible mounts mounting the heat exchanger to each the flange.

In another embodiment according to any of the previous embodiments, there are also at least two more of the flexible mounts positioned at two circumferentially spaced locations and mounting the heat exchanger to the intermediate engine case at circumferentially spaced locations, and the flexible mounts at the axially spaced locations allow movement in at least one different dimension than the flexible mounts at the circumferentially spaced locations.

In another embodiment according to any of the previous embodiments, the flexible mounts each include a first portion connected to the heat exchanger and a second portion connected to the intermediate case and there being a plurality of fingers on each of the first and second portion which are interdigitated and biased together, but which can move relative to each other.

In another embodiment according to any of the previous embodiments, the flexible mount includes an outer spring clip biasing the interdigitated fingers together.

In another embodiment according to any of the previous embodiments, the interdigitated fingers have outer portions where they are squeezed together and portions where the fingers are interdigitated which are spaced from each other by a greater distance than the outer portions.

In another embodiment according to any of the previous embodiments, the static structure is the intermediate engine case.

In another embodiment according to any of the previous embodiments, at least two flanges are formed on the static structure at two axially spaced locations and there being one of the flexible mounts connecting the heat exchanger to each the flange, and the flexible mount allowing movement between the static structure and the heat exchanger in at least two dimensions.

In another embodiment according to any of the previous embodiments, there are also at least two more of the flexible mounts positioned at two circumferentially spaced locations and mounting the heat exchanger to the static structure at circumferentially spaced locations.

In another embodiment according to any of the previous embodiments, the flexible mounts at the axially spaced locations allow movement in at least one different dimension than the flexible mounts at the circumferentially spaced locations.

In another embodiment according to any of the previous embodiments, the flexible mounts each include a first portion connected to the heat exchanger and a second portion connected to the static structure and there being a plurality of fingers on each of the first and second portion which are interdigitated and biased together, but which can move relative to each other.

In another embodiment according to any of the previous embodiments, the flexible mount includes an outer spring clip biasing the interdigitated fingers together.

In another embodiment according to any of the previous embodiments, the interdigitated fingers have outer portions where they are squeezed together and portions where the fingers are interdigitated which are spaced from each other by a greater distance than the outer portions.

In another embodiment according to any of the previous embodiments, there are also at least two of the flexible mounts positioned at two circumferentially spaced locations and mounting the heat exchanger to the static structure at circumferentially spaced locations.

In another embodiment according to any of the previous embodiments, the flexible mount includes a first portion connected to the heat exchanger and a second portion connected to the static structure and there being a plurality of fingers on each of the first and second portion which are interdigitated and biased together, but which can move relative to each other, and the flexible mount allowing movement between the static structure and the heat exchanger in at least two dimensions.

In another embodiment according to any of the previous embodiments, the flexible mount includes an outer spring clip biasing the interdigitated fingers together.

In another embodiment according to any of the previous embodiments, the interdigitated fingers have outer portions where they are squeezed together and are spaced from each other by a greater distance where the fingers are interdigitated.

In another embodiment according to any of the previous embodiments, the gas turbine engine includes a fan case positioned outwardly of an intermediate engine case, and the heat exchanger is mounted within the intermediate engine case.

These and other features may be best understood from the following drawings and specification.

BRIEF DESCRIPTION OF THE DRAWINGS

FIG. 6 shows an example heat exchanger.

DETAILED DESCRIPTION

Figure 1:
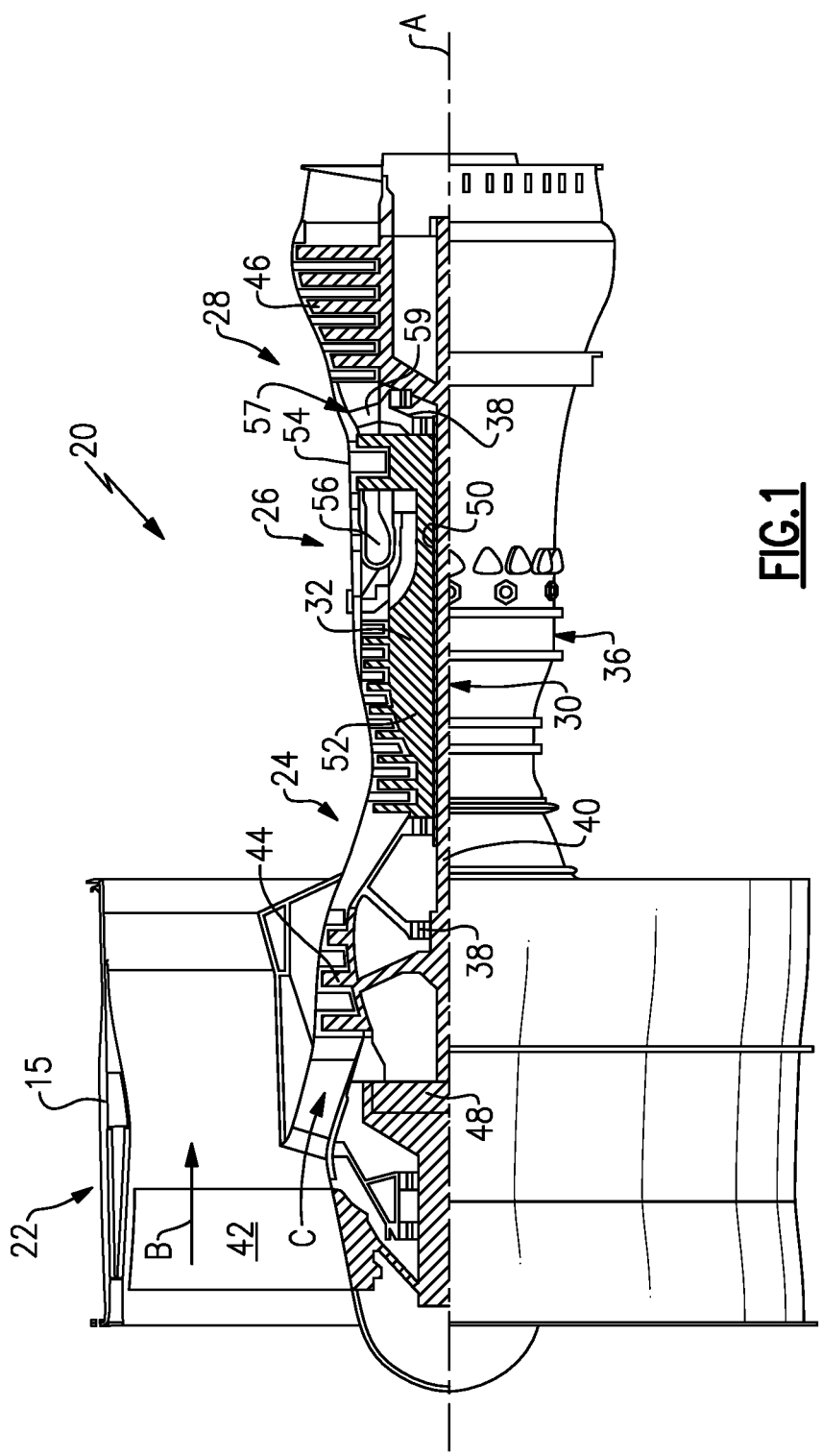
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]$^{0.5}$. The "Low corrected fan tip speed" as disclosed herein according to one non-limiting embodiment is less than about 1150 ft/second (350.5 meters/second).

Figure 2A:
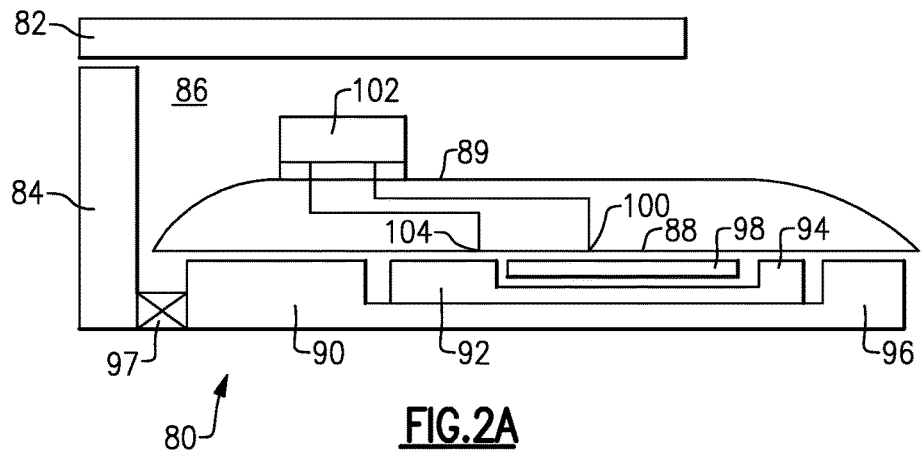
FIG. 2A shows details of a heat exchanger.

FIG. 2A shows a portion of an engine 80. A fan case 82 surrounds a fan rotor 84. A bypass duct 86 is defined inwardly of fan case 82 and outwardly of an intermediate case 89. An inner core housing 88 is spaced from intermediate housing 89. A low pressure compressor 90, a high pressure compressor 92, a high pressure turbine 94, and a low pressure turbine 96 are shown schematically. Low pressure turbine 96 drives the fan rotor 84 through a gear reduction 97. A combustor 98 is also shown.

Cooling air to be utilized is tapped at 100, preferably at a location downstream of the high pressure compressor 92 such that it will be at high pressure. The air is passed into a heat exchanger 102 where it is cooled by bypass air in the bypass duct 86. That cooled air is then returned to an inlet line 104 where it passes back into the engine and then may pass radially inwardly to cool components such as the high pressure turbine 94.

Figure 2B:
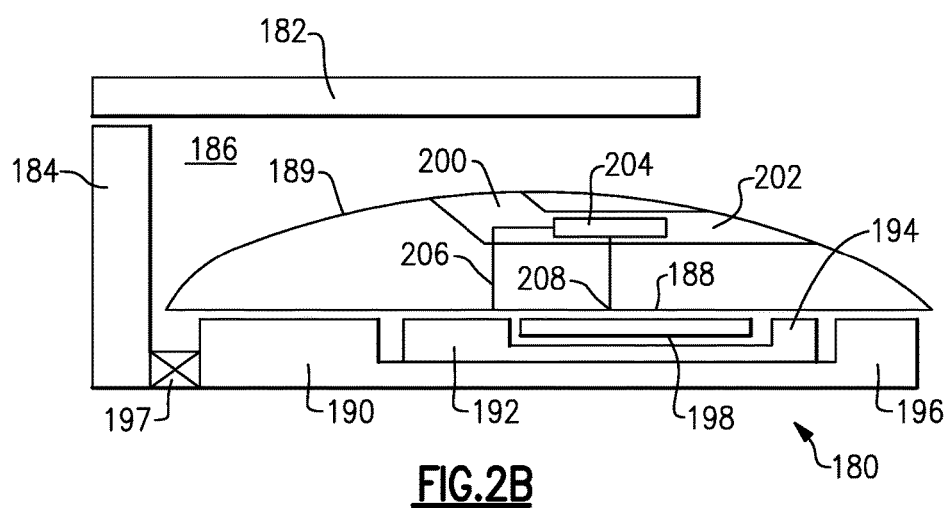
FIG. 2B shows an alternative mount location.

FIG. 2B shows an engine 180 with an alternative mount location for the heat exchanger 204. In FIG. 2B, the elements described in FIG. 2A are repeated with the reference numerals raised to 200s. The operation may generally be similar to the FIG. 2A embodiment. However, in FIG. 2B, a heat exchanger 204 is mounted within an intermediate case 189. A scoop inlet 200 captures bypass air from the bypass duct 186 and brings it within the housing 189, and over the heat exchanger 204 to an exit 202. Air to be cooled is tapped from location 208 and returned to location 206.

While the further description is made with reference to the heat exchanger 102, it should be understood that with appropriate modification, all of the description relative to a damper mounting could apply to the location of the heat exchanger 204.

Figure 3:
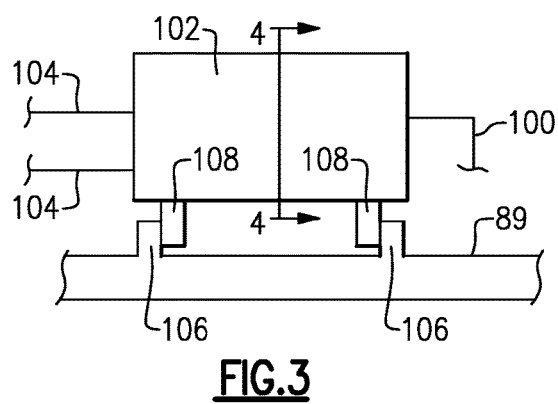
FIG. 3 is a detailed view of a portion of FIG. 2.

FIG. 3 show details of the mount of the heat exchanger 102. As shown, the intermediate case 89 has axially spaced flanges 106. Damper mounts 108 flexibly mount the heat exchanger 102 on the case 89 by being connected to the flanges 106. As will be described, the flexible mounts 108 allow movement in two dimensions, generally, radially inwardly and outwardly as shown in FIG. 3 and also into and out of the plane of the paper of FIG. 3, or circumferentially about the engine.

Figure 4:
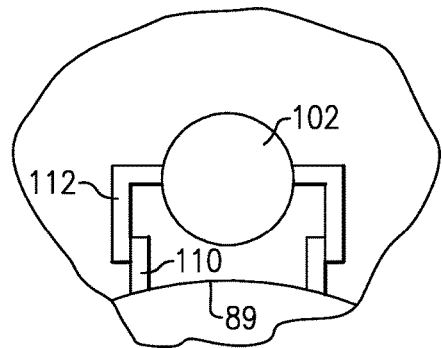
FIG. 4 is a cross-sectional view taken along line 4-4 of FIG. 3.

FIG. 4 is another view showing additional flexible damper mounts 112 connected to an additional structure 110 on the intermediate case 89. Dampers 112 also allow adjustment in two dimensions, axially along a center axis of the engine and also radially inwardly and outwardly.

The combination of dampers which may include at least four dampers, as shown, provides damping tolerance to resist vibration and also allows adjustment to withstand expansion and stresses.

Figure 5:
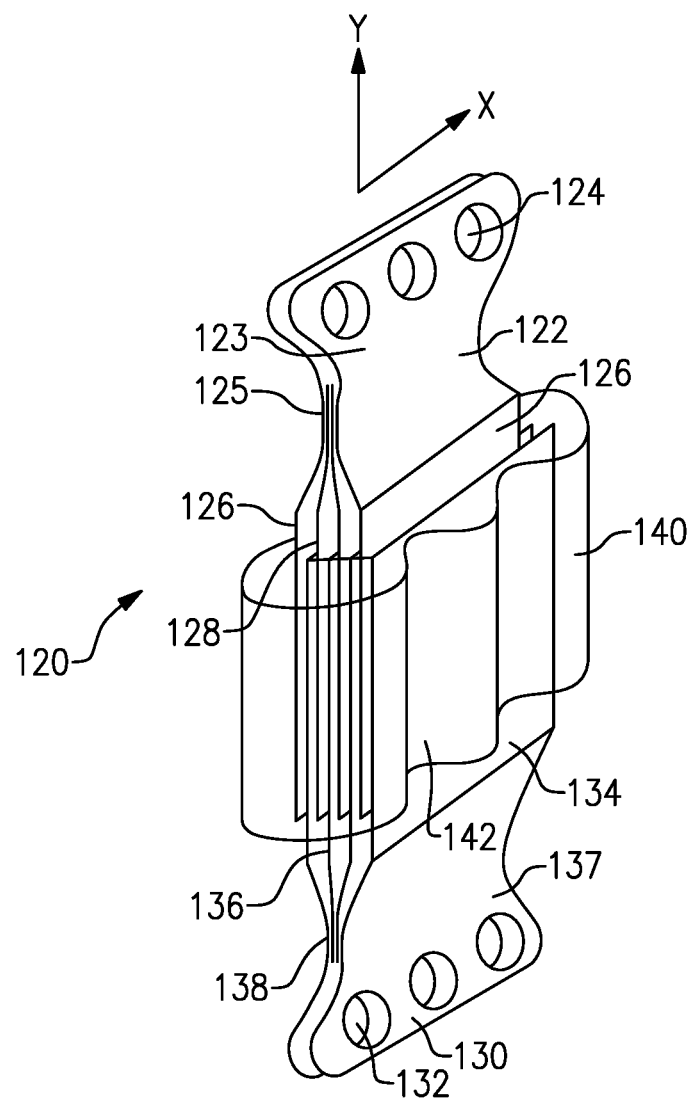
FIG. 5 shows an example damper mount.

FIG. 5 shows a flexible damper embodiment 120. As shown, one portion 122 has bolt holes 124 to be bolted to either the heat exchanger or the case as shown in FIGS. 3 and 4. An outer area 123 is shown adjacent the bolt holes 124. A plurality of interdigitated fingers 126/128 and 134/136 are shown. In the illustrated embodiment, there are four fingers 126/128 on portion 122 and four others 134/136 on an opposed portion 130. The opposed portion 130 is bolted through bolt holes 132 to the other of the heat exchanger and casing 89. The fingers include outer fingers 126 and inner fingers 128 on portion 122 and outer fingers 134 and inner fingers 136 on portion 130.

The fingers 126/128 are squeezed together by the outer area 123 at outer finger portions 125 compared to being separated by more space and in the area where they are interdigitated. The fingers 134 and 136 are also squeezed together at outer portions 138 within the outer area 137. A clamp member 140 is squeezed at 142 to provide a spring for urging the fingers together.

Still, as can be appreciated, the fingers are allowed to move in two dimensions thus providing the damper function as mentioned above.

Such a mount is particularly beneficial when highly engineered modern heat exchangers are used such as the heat exchanger 102 illustrated in FIG. 6.

FIG. 6 shows a cross-section of an embodiment 102 schematically. In heat exchanger 102, there is line 100 leading to two lines 104. Part of the flow path includes very small tubes 144. With such fine tubes 144, the provision of the vibration and stress damping is particularly beneficial.

The heat exchanger such as shown in FIG. 6 is disclosed in more detail in U.S. patent application Ser. No. 15/138,727, filed on Apr. 26, 2016 and entitled "Heat Exchanger with Heat Resistant Center Body."

While a particular flexible mount has been disclosed, it should be understood in one aspect other type flexible mounts allowing movement between a static structure and a heat exchanger in at least two dimensions are envisioned. In other embodiments, a flexible mount simply allowing movement between the static structure and the heat exchanger may come within the scope of this disclosure.

Notably, while the portions of the flexible mounts are shown as bolted (fixed) to the heat exchanger and static structure, there could be intermediate, non-fixed connecting elements. All that is required is that the flexible mount(s) connect or mount the two together.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a core engine having a compressor section and a turbine section, and said compressor section including a low pressure compressor and a high pressure compressor;
a cooling air system for tapping compressed air and passing the compressed air through a heat exchanger, and cooling air passing over said heat exchanger to cool said compressed air, said compressed air being returned to said core engine to provide a cooling function;
said heat exchanger being mounted through a flexible mount allowing movement between a static structure and said heat exchanger;
wherein at least two flanges are formed on said static structure at two axially spaced locations and there being one of said flexible mount connecting said heat exchanger to each said flange, and each said flexible mount allowing movement between said static structure and said heat exchanger in at least two dimensions; and
wherein there are also at least two more of said flexible mounts positioned at two circumferentially spaced locations and mounting said heat exchanger to said static structure at circumferentially spaced locations.

2. The gas turbine engine as set forth in claim 1, wherein said heat exchanger is positioned between a fan case and an intermediate engine case surrounding said core engine.

3. The gas turbine engine as set forth in claim 1, wherein at least two flanges are formed on said intermediate engine case at two axially spaced locations and there being one of said flexible mount mounting said heat exchanger to each said flange.

4. A gas turbine engine comprising:
a core engine having a compressor section and a turbine section, and said compressor section including a low pressure compressor and a high pressure compressor;
a cooling air system for tapping compressed air and passing the compressed air through a heat exchanger, and cooling air passing over said heat exchanger to cool said compressed air, said compressed air being returned to said core engine to provide a cooling function;
said heat exchanger being mounted through a flexible mount allowing movement between a static structure and said heat exchanger;
wherein said flexible mount allowing movement between said static structure and said heat exchanger in at least two dimensions;
wherein said heat exchanger is positioned between a fan case and an intermediate engine case surrounding said core engine;
wherein at least two flanges are formed on said intermediate engine case at two axially spaced locations and there being one of said flexible mount mounting said heat exchanger to each said flange; and
wherein there are also at least two more of said flexible mounts positioned at two circumferentially spaced locations and mounting said heat exchanger to said intermediate engine case at circumferentially spaced locations, and said flexible mounts at said axially spaced locations allow movement in at least one different dimension than said flexible mounts at said circumferentially spaced locations.

5. The gas turbine engine as set forth in claim 4, wherein said flexible mounts each include a first portion connected to said heat exchanger and a second portion connected to said intermediate case and there being a plurality of fingers on each of said first and second portion which are interdigitated and biased together, but which are movable relative to each other.

6. The gas turbine engine as set forth in claim 5, wherein said flexible mount includes an outer spring clip biasing said interdigitated fingers together.

7. The gas turbine engine as set forth in claim 6, wherein said interdigitated fingers have outer portions where they are squeezed together and portions where said fingers are interdigitated which are spaced from each other by a greater distance than said outer portions.

8. The gas turbine engine as set forth in claim 1, wherein said static structure is said intermediate engine case.

9. The gas turbine engine as set forth in claim 1, wherein said flexible mounts at said axially spaced locations allow movement in at least one different dimension than said flexible mounts at said circumferentially spaced locations.

10. The gas turbine engine as set forth in claim 9, wherein said flexible mounts each include a first portion connected to said heat exchanger and a second portion connected to said static structure and there being a plurality of fingers on each of said first and second portion which are interdigitated and biased together, but which are movable relative to each other.

11. The gas turbine engine as set forth in claim 10, wherein said flexible mount includes an outer spring clip biasing said interdigitated fingers together.

12. The gas turbine engine as set forth in claim 11, wherein said interdigitated fingers have outer portions where they are squeezed together and portions where said fingers are interdigitated which are spaced from each other by a greater distance than said outer portions.

13. The gas turbine engine as set forth in claim 1, wherein there are also at least two of said flexible mounts positioned at two circumferentially spaced locations and mounting said heat exchanger to said static structure at circumferentially spaced locations.

14. A gas turbine engine comprising:
a core engine having a compressor section and a turbine section, and said compressor section including a low pressure compressor and a high pressure compressor;
a cooling air system for tapping compressed air and passing the compressed air through a heat exchanger, and cooling air passing over said heat exchanger to cool said compressed air, said compressed air being returned to said core engine to provide a cooling function;
said heat exchanger being mounted through a flexible mount allowing movement between a static structure and said heat exchanger; and
wherein said flexible mount includes a first portion connected to said heat exchanger and a second portion connected to said static structure and there being a plurality of fingers on each of said first and second portion which are interdigitated and biased together, but which are movable relative to each other, and said flexible mount allowing movement between said static structure and said heat exchanger in at least two dimensions.

15. The gas turbine engine as set forth in claim 14, wherein said flexible mount includes an outer spring clip biasing said interdigitated fingers together.

16. The gas turbine engine as set forth in claim 15, wherein said interdigitated fingers have outer portions where they are squeezed together and are spaced from each other by a greater distance where said fingers are interdigitated.

17. The gas turbine engine as set forth in claim 1, wherein said gas turbine engine includes a fan case positioned outwardly of an intermediate engine case, and said heat exchanger is mounted within said intermediate engine case.

* * * * *